United States Patent
Hurwitz et al.

(10) Patent No.: US 7,392,061 B2
(45) Date of Patent: Jun. 24, 2008

(54) METHODS AND APPARATUS FOR OPERATING TRANSCEIVER SYSTEMS OF A WIRELESS PLATFORM

(75) Inventors: Roger A. Hurwitz, Portland, OR (US); Jeffrey S. McVeigh, Portland, OR (US); Thomas M. Cronin, Hillsboro, OR (US); Rajesh Banginwar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 11/014,580

(22) Filed: Dec. 15, 2004

(65) Prior Publication Data
US 2006/0128350 A1    Jun. 15, 2006

(51) Int. Cl.
*H04M 1/00*    (2006.01)
(52) U.S. Cl. ............... 455/552.1; 455/553.1; 455/574; 455/343.2
(58) Field of Classification Search .......... 455/552.1, 455/553.1, 574, 343.2
See application file for complete search history.

(56) References Cited

U.S. PATENT DOCUMENTS

| | | | |
|---|---|---|---|
| 6,788,924 B1* | 9/2004 | Knutson et al. | 455/265 |
| 2003/0236890 A1 | 12/2003 | Hurwitz et al. | |
| 2004/0128382 A1 | 7/2004 | Shimoda et al. | |
| 2004/0240525 A1 | 12/2004 | Karbinis et al. | |
| 2005/0075130 A1* | 4/2005 | Godfrey | 455/552.1 |
| 2005/0181840 A1 | 8/2005 | Banginwar et al. | |
| 2006/0035590 A1* | 2/2006 | Morris et al. | 455/41.2 |

FOREIGN PATENT DOCUMENTS

| | | | |
|---|---|---|---|
| EP | 1119137 A1 * | 7/2001 | |
| EP | 1199842 A2 * | 4/2002 | |
| EP | 1207654 A2 * | 5/2002 | |
| WO | WO 2004/004187 | 1/2004 | |

OTHER PUBLICATIONS

Rajesh Banginwar, "Power Management Within a Wireless Communication System", U.S. Appl. No. 10/320,177, filed Dec. 16, 2002.

\* cited by examiner

*Primary Examiner*—Sanh D Phu
(74) *Attorney, Agent, or Firm*—Schwabe, Williamson & Wyatt, P.C.

(57) ABSTRACT

Embodiments of methods and apparatus to operate transceiver systems of a wireless platform are generally described herein. Other embodiments may be described and claimed.

27 Claims, 3 Drawing Sheets

METHODS AND APPARATUS FOR OPERATING TRANSCEIVER SYSTEMS OF A WIRELESS PLATFORM

TECHNICAL FIELD

The present disclosure relates generally to wireless communication systems, and more particularly, to methods and apparatus for operating transceiver systems of a wireless platform.

BACKGROUND

As technology advances to provide greater wireless communication capabilities, more and more electronic devices may include multiple transceiver systems. In particular, a wireless electronic device may operate in accordance with multiple wireless communication protocols such as Global System for Mobile communications (GSM), General Packet Radio Services (GPRS), Bluetooth, 802.xx family of standards developed by the Institute of Electrical and Electronic Engineers (IEEE) and/or variations and evolutions of these standards, etc. to communicate with various communication networks via communication nodes (e.g., base station(s), access point(s), etc.). For example, a laptop computer including multiple transceiver systems may communicate with a wireless peripheral (e.g., a printer) via a first transceiver system operating in accordance with a first wireless communication protocol (e.g., Bluetooth) and communicate with an access point to access the Internet via a second transceiver system operating in accordance with a second wireless communication protocol (e.g., IEEE std. 802.11b-1999). Further, the laptop computer may communicate with a base station to transmit/receive short text messages (e.g., instant messaging service) via a third transceiver system operating in accordance with a third wireless communication protocol (e.g., GSM/GPRS). Although such wireless communication capabilities may provide greater convenience to individuals, the wireless electronic device may require additional resources (e.g., power) to support the multiple transceiver systems.

DETAILED DESCRIPTION

In general, methods and apparatus for operating transceiver systems of a wireless platform are described herein. According to one example embodiment, a wireless platform having a plurality of transceiver systems may be configured to manage power consumption of the plurality of transceiver systems. In particular, the plurality of transceiver systems may include a host transceiver system and one or more client transceiver systems. To reduce power consumption, the client transceiver system(s) may be disabled from receiving incoming communication (e.g., shut off or operating in a sleep mode). While the client transceiver system(s) are disabled, the host transceiver system may be active to receive a notification indicative of an incoming communication associated with a particular client transceiver system. In response to receipt of the notification, the host transceiver system may transmit an alert to that particular client transceiver system. Accordingly, the client transceiver system may be enabled to receive the incoming communication. The methods and apparatus described herein are not limited in this regard.

Figure 1:
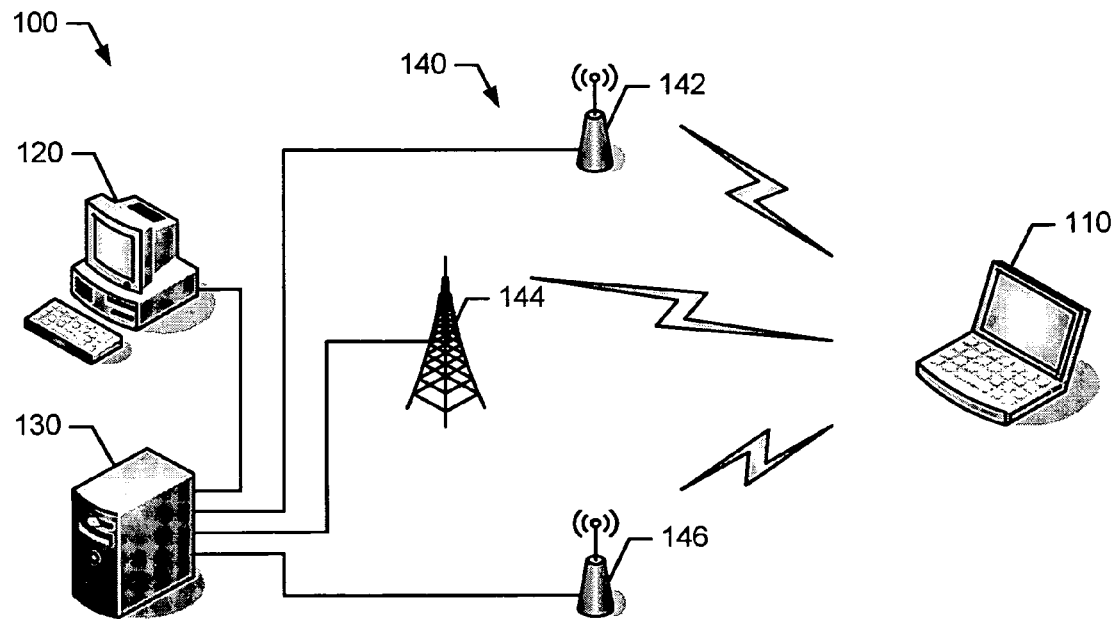
FIG. 1 is a schematic diagram representation of an example wireless communication system according to an embodiment of the methods and apparatus disclosed herein.

In the example of FIG. 1, an example wireless communication system 100 including a wireless electronic device 110 is described herein. For example, the wireless electronic device 110 may be a laptop computer, a handheld computer, a tablet computer, a desktop computer, a television, a cellular telephone (e.g., a smart phone), a pager, an audio and/or video player (e.g., an MP3 player or a DVD player), a game device, a digital camera, a navigation device (e.g., a GPS device), a wireless peripheral (e.g., a keyboard, a printer, etc.), a remote control, and/or other suitable wireless electronic devices. The wireless electronic device may include a wireless platform (e.g., one shown as 200 in FIG. 2) configured to operate in accordance with a plurality of wireless communication protocols to communicate with other wired and/or wireless platforms, devices, nodes, etc. For example, these wireless communication protocols may be based on analog, digital, and/or dual-mode communication system standards such as the Global System for Mobile Communications (GSM) standard, the Frequency Division Multiple Access (FDMA) standard, the Time Division Multiple Access (TDMA) standard, the Code Division Multiple Access (CDMA) standard, the Wideband CDMA (WCDMA) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards.

Figure 2:
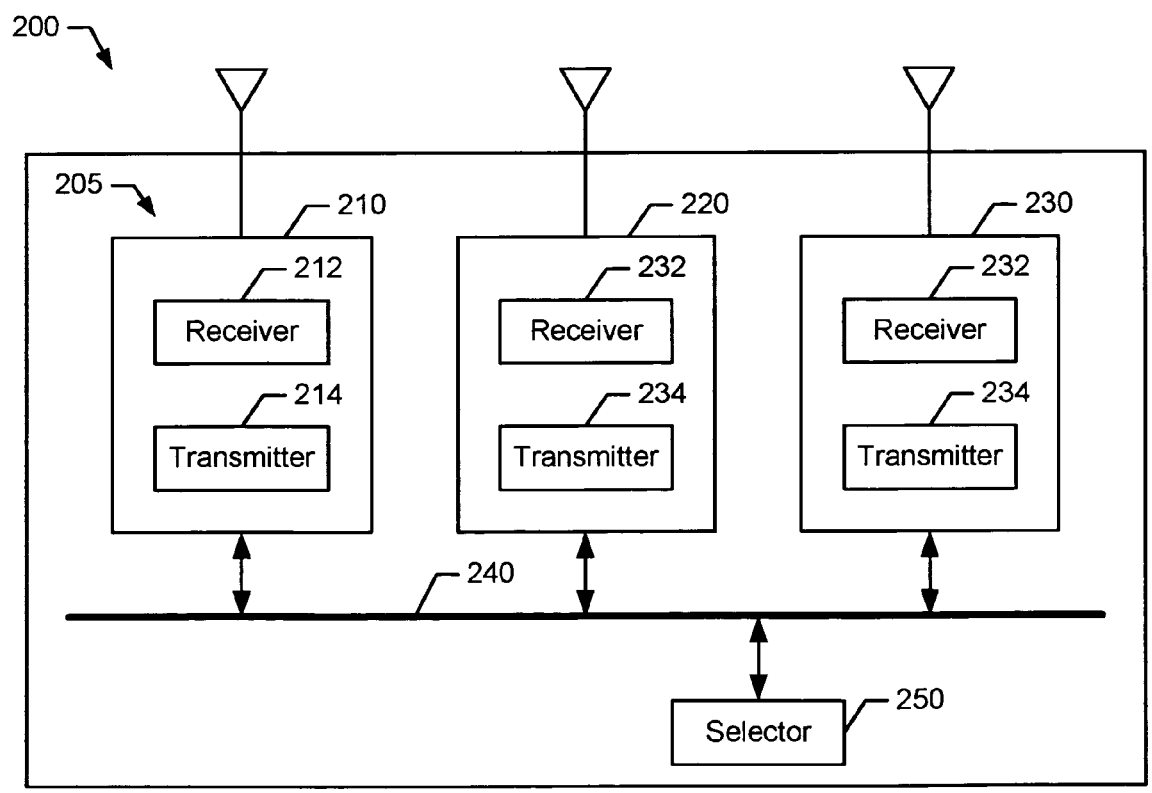
FIG. 2 is a block diagram representation of an example wireless platform.

Referring to FIG. 2, for example, the wireless platform 200 may include a plurality of transceiver systems 205, generally shown as 210, 220, and 230. Each of the plurality of transceiver systems 205 may include a receiver (e.g., 212, 222, and 232) and a transmitter (e.g., 214, 224, and 234). The plurality of transceiver systems 205 may communicate with each other via a bus 240 and/or other suitable type of communication interfaces. Although FIG. 2 depicts three transceiver systems, the wireless platform 200 may include additional or fewer transceiver systems.

As noted above, the wireless platform 200 may operate in accordance with a plurality of wireless communication protocols. For example, the first transceiver system 210 may operate in accordance with a first wireless communication protocol, the second transceiver system 220 may operate in accordance with a second wireless communication protocol, and the third transceiver system 230 may operate in accordance with a third wireless communication protocol. In particular, the plurality of transceiver systems 205 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate.

In one example, the first transceiver system 210 may implement OFDM modulation to transmit large amounts of digital data by splitting a radio frequency signal into multiple small sub-signals, which in turn, are transmitted simultaneously at different frequencies. In particular, the first transceiver system 210 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate. The second and third transceiver systems 220 and 230 may operate in accordance with other wireless communication protocols. For example, the second transceiver system 220 may operate in accordance with GSM and the third transceiver system 230 may operate in accordance with Bluetooth. The plurality of transceiver systems 205 may also operate in accordance with other suitable wireless communication protocols that require very low power such as Ultra Wideband (UWB), Near Field Communication (NFC), and/or radio frequency identification (RFID) to communicate with the plurality of communication nodes 140.

The wireless platform 200 may also include a selector 250 to manage the plurality of transceiver systems 205. In particular, the wireless platform 200 may automatically select one of the plurality of transceiver systems 205 to operate as the host transceiver system with the remaining transceiver systems operating as client transceiver systems. For example, the selector 250 may designate the host transceiver system based on the power consumption of the plurality of transceiver systems 205. That is, the transceiver system having the lowest power consumption level among all of the plurality of transceiver systems 205 may be selected as the host transceiver system (e.g., a transceiver system configured to consume less power than other transceiver systems). In one example, a transceiver system operating in accordance with a wireless communication protocol that requires very low power (e.g., Bluetooth) may be selected as the host transceiver system. Thus, the remaining transceiver systems may conserve power by operating as client transceiver systems. For example, the second transceiver system 144 may be selected as the host transceiver system while the first and third transceiver systems 142 and 146 may operate as client transceiver systems.

The selector 250 may also select one of the plurality of transceiver systems to operate as the host transceiver system when the wireless platform 200 is within a coverage area of that particular transceiver system. For example, the selector 250 may select the second transceiver system 144 to operate as the host transceiver system when the wireless platform 200 is within the coverage area of the second transceiver system 144. In some circumstances, the wireless platform 200 may not be able to use the designated host transceiver system. For example, the wireless platform 200 may be outside of a coverage area of the designated host transceiver system and/or encounter an obstruction such as a wall, a building, etc. Accordingly, the selector 250 may select another transceiver system from the plurality of transceiver systems 205 to operate as the host transceiver system for the wireless platform 200.

Further, the selector 250 may also select one of the plurality of transceiver systems to operate as the host transceiver system based on which transceiver system is currently being used or was last used to communicate with one of the plurality of communication nodes 140. In another example, each of the plurality of transceiver systems 205 may take turn to operate as the host transceiver system for a predefined time period in a round-robin manner (e.g., a duty cycle of one hour). Alternatively, an individual may designate one of the plurality of transceiver systems 205 as the host transceiver system.

Although the examples described above disclose designating one of the plurality of transceiver systems 205 as the host transceiver system, two or more of the plurality of transceiver systems 205 may be designated as host transceiver systems. Also, while the components shown in FIG. 2 are depicted as separate blocks within the wireless platform 200, the functions performed by some of these blocks may be integrated within a single semiconductor circuit or may be implemented using two or more separate integrated circuits. For example, although the receiver 212 and the transmitter 214 are depicted as separate blocks within the first transceiver system 210, the receiver 212 may be integrated into the transmitter 214. Likewise, the receivers 222 and 232 may be integrated into the transmitters 224 and 234, respectively. The methods and apparatus described herein are not limited in this regard.

Turning back to FIG. 1, the wireless communication system 100 may also include a correspondent device 120, a wake-up server 130, and a plurality of communication nodes 140, generally shown as 142, 144, and 146. As described in detail below, the correspondent device 120 may be operatively coupled to the wake-up server 130 via a wired and/or wireless communication link to transmit a communication request to the wake-up server 130. The wake-up server 130 may be configured to notify the wireless platform 200 that the correspondence device 120 is requesting to communicate with the wireless electronic device 110 via one of the plurality of transceiver systems 205. The wake-up server 130 may communicate with each of the plurality of transceiver systems 205 via one or more of the plurality of communication nodes 140. For example, the plurality of communication nodes 140 may include access points (e.g., two shown as 142 and 146) and/or base stations (e.g., one shown as 144). The wake-up server 130 may communicate with the first transceiver system 210 via the first communication node 142, communicate with the second transceiver system 220 via the second communication node 144, and communicate with the third transceiver system 230 via the third communication node 146.

Further, the wireless communication system 100 may include other wireless local area network (WLAN) devices, wireless metropolitan area network (WMAN) devices, and/or wireless wide area network (WWAN) devices (not shown). For example, the wireless communication system 100 may include devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Typically, the correspondent device 120 may communicate directly with the wireless electronic device 110 via one or more of the plurality of transceiver systems 205. In one example, the correspondent device 120 may be configured to communicate with the wireless electronic device 110 via the first transceiver system 210 because the correspondence device 120 and the first transceiver system 210 may be operating in accordance with the same wireless communication protocol (e.g., IEEE std. 802.11b). To conserve power consumption of the wireless electronic device 110, however, the wireless platform 200 may designate one of the plurality of transceiver systems 205 to operate as a host transceiver system and the remaining transceiver systems to operate as client transceiver systems (e.g., the remaining transceiver systems are disabled). For example, the second transceiver system 220 may be designated as the host transceiver system, and the first and third transceiver systems 210 and 230 may operate as client transceiver systems. The second transceiver system 220 may be configured to receive a notification from the wake-up server 130 via the second communication node 144. Accordingly, the first transceiver systems 210 and 230 may be disabled from receiving incoming communication via the plurality of communication nodes 140 (e.g., shut off or operating in a low-power mode such as a sleep mode).

Figure 3:
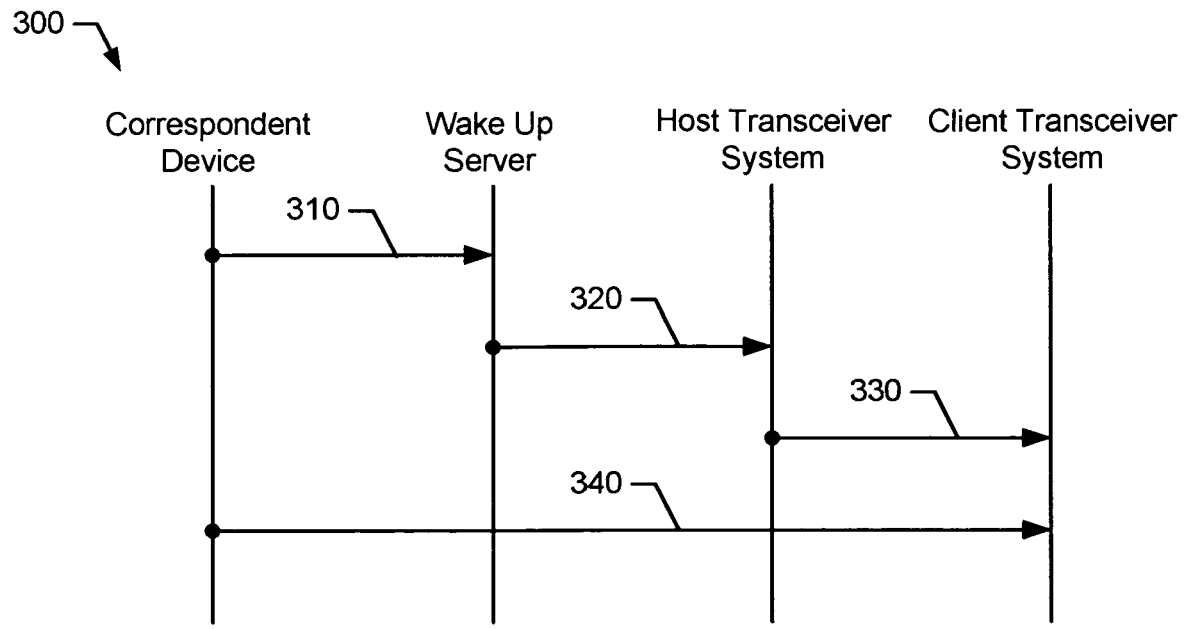
FIG. 3 is a sequence diagram representation of one manner in which the example wireless communication system of FIG. 1 may be implemented.

Turning to FIG. 3, for example, the correspondent device 120 may transmit a communication request to the wake-up server 130 so that the correspondent device 120 may communicate with the wireless electronic device 110 via the first transceiver system 210 (e.g., a client transceiver system of the wireless platform 200) (310). Accordingly, the wake-up server 130 may transmit a notification to the second transceiver system 220 (e.g., the host transceiver system of the wireless platform 200) (320). In turn, the second transceiver system may transmit an alert (e.g., a wake-up call, message, and/or ping) to the first transceiver system 210 so that the first transceiver system 210 may wake-up (e.g., powered up or operating in an idle mode) and prepare to receive an incoming communication from the correspondent device 120 (330). Thus, the correspondent device 120 may communicate with the wireless electronic device 110 via the first transceiver system 210. The methods and apparatus described herein are not limited in this regard.

While the components shown in FIG. 1 are depicted as separate components within the wireless communication system 100, the functions performed by some of these components may be integrated within a single component or may be implemented using two or more separate integrated circuits. For example, although FIG. 1 depicts a central wake-up server 130, the functions performed by the wake-up server 130 may be integrated into each of the plurality of communication nodes 140. Thus, each of the plurality of communication nodes 140 may include a wake-up component to receive a communication request from the correspondent node 120 and to transmit a notification to the wireless platform 200. In another example, although the wireless electronic device 110 and the wake-up server 130 are depicted as separate components within the wireless communication system 100, the wake-up server 130 may be integrated into the wireless electronic device 110. The methods and apparatus described herein are not limited in this regard.

Figure 4:
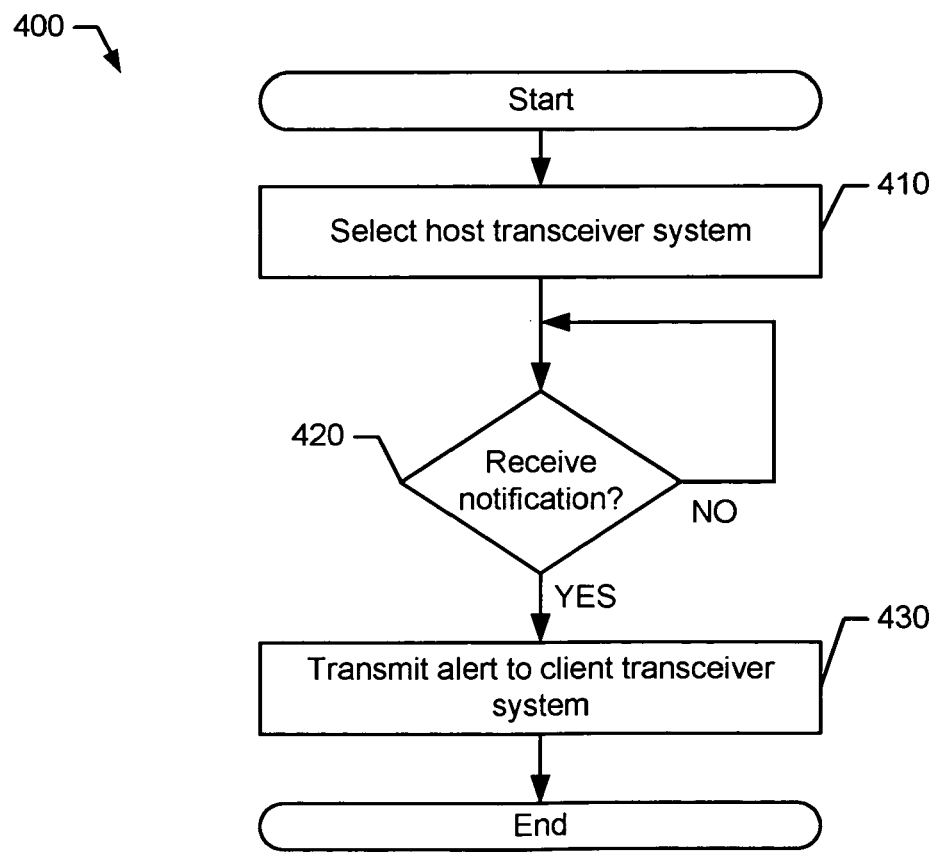
FIG. 4 depicts one manner in which the example wireless platform of FIG. 2 may be configured to operate a plurality of transceiver systems.

FIG. 4 depicts one manner in which one of the plurality of transceiver systems 205 of FIG. 2 may be configured to operate as a host transceiver system. The example process 400 of FIG. 4, respectively, may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 4, these actions can be performed in other temporal sequences. Again, the example process 400 is merely provided and described in conjunction with the apparatus of FIGS. 1 and 2 as an example of one way to configure a transceiver system of a wireless platform to operate as a host device.

In the example of FIG. 4, the process 400 begins with the wireless platform 200 (e.g., via the selector 250) selecting one of the plurality of transceiver systems 205 to operate as a host transceiver system to monitor for notification(s) associated with client transceiver system(s) (block 410). In one particular example, the transceiver system having the lowest power consumption level among all of the plurality of transceiver systems 205 may be selected as the host transceiver system (e.g., a transceiver system configured to consume less power than other transceiver systems). As noted above, other selection processes may be used to designate the host transceiver system. The remaining transceiver system(s) of the plurality of transceiver systems 205 may operate as client transceiver system(s). In particular, the client transceiver system(s) may be disabled from receiving incoming communication via the plurality of communication nodes 140 (e.g., shut off or operating in a sleep mode).

Accordingly, the host transceiver system may monitor for notification(s) associated with client transceiver system(s) (block 420). If the host transceiver system fails to detect a notification, the host transceiver system may continue to monitor for a notification. Otherwise if the host transceiver system receives a notification associated with one of the client transceiver systems, the host transceiver system may transmit an alert to that particular client transceiver system (block 430). The alert may indicate that a correspondent device is requesting to communicate with that particular client transceiver system.

In one example, the second transceiver system 220 may be selected as the host transceiver system as described above, and the correspondent device 120 may request to communicate with the wireless electronic device 110 via the first transceiver system 210. The wake-up server 130 may transmit a notification to the second transceiver system 220 via the second communication node 144 indicating that the correspondent device 120 requests to communicate with the wireless electronic device 110 via the first transceiver system 210. Accordingly, the second transceiver system 220 may receive the notification from the wake-up server 130 via the second communication node 144. In response to the notification, the second transceiver system 220 may transmit an alert to the first transceiver system 210 via the bus 240 (e.g., to wake-up the first transceiver system 210). Accordingly, the first transceiver system 210 may wake-up and prepare to receive an incoming communication from the correspondence device 120 via the first communication node 142. The methods and apparatus described herein are not limited in this regard.

Although the methods and apparatus disclosed herein are well suited for incoming communication such as voice calls and/or messages, the methods and apparatus disclosed herein are readily applicable to many other types of communication services such as short messaging service (SMS), enhanced messaging service (EMS), multimedia messaging service (MMS), etc. In addition, the methods and apparatus disclosed herein may be implemented to wireless communication systems that support communication of text, images, streaming audio/video clips, and/or any other multimedia applications. Further, while the methods and apparatus disclosed herein are described with respect to wireless personal area networks (WPANs), the methods and apparatus disclosed herein may be applied to other suitable types of wireless communication networks. For example, the methods and apparatus disclosed herein may be applied to wireless local area networks (WLANs), wireless metropolitan area networks (WMANs), and/or wireless wide area networks (WWANs).

While the methods and apparatus disclosed herein are described with respect to portable wireless electronic devices, the methods and apparatus disclosed herein may be applied to other suitable types of wireless platforms. For example, the methods and apparatus disclosed herein may be applied to relatively-stationary wireless electronic devices such as a desktop computer, an external display, an access point device, a mesh point device, a television, a household appliance, etc.

Figure 5:
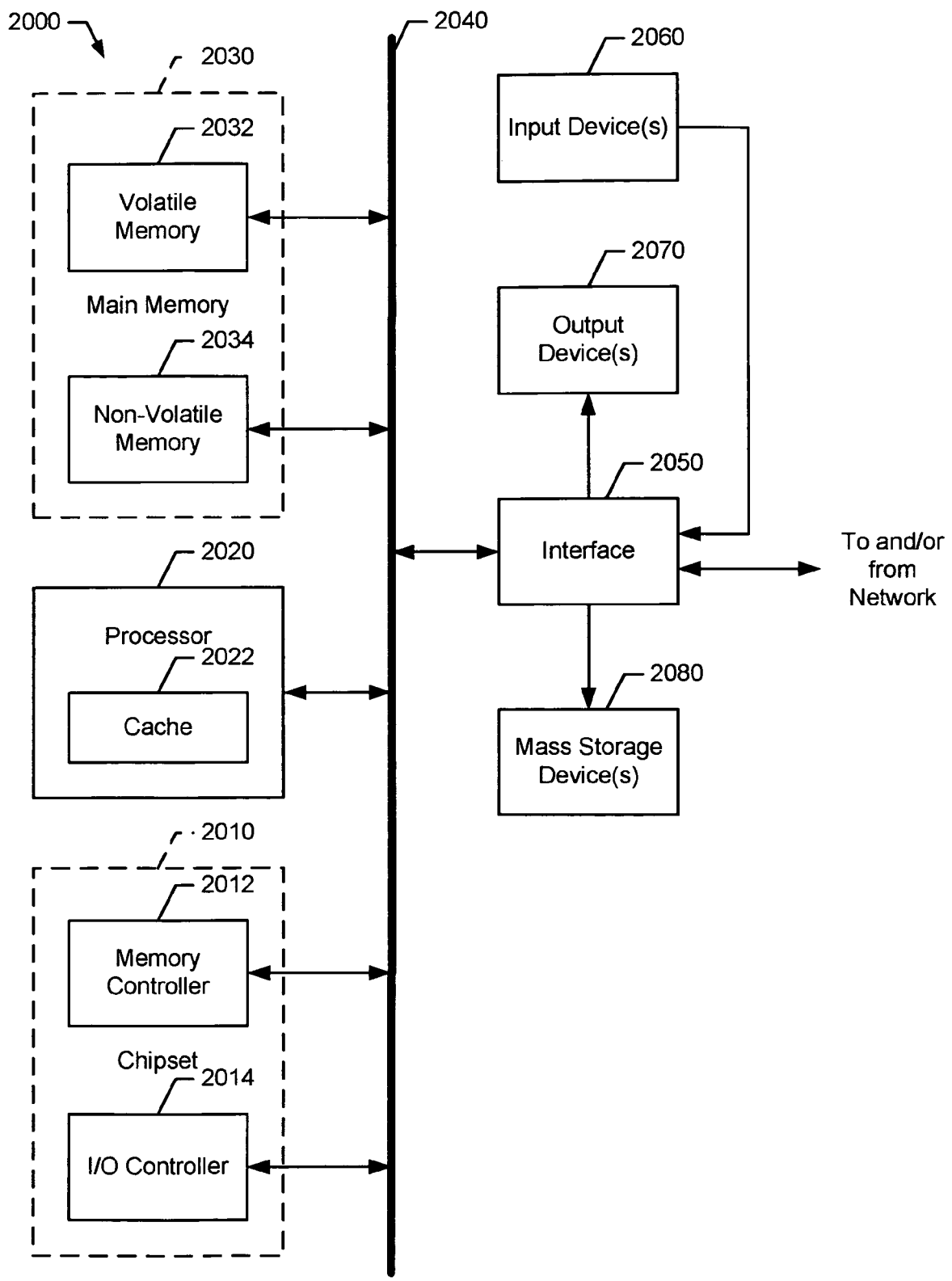
FIG. 5 is a block diagram representation of an example processor system that may be used to implement the example wireless communication system of FIG. 1.

FIG. 5 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 5 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 5 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:

receiving a notification at a first transceiver system of a wireless platform having a plurality of transceiver systems, the notification being indicative of an incoming communication from a wireless network and associated with a second transceiver system of the wireless platform; and transmitting an alert from the first transceiver system to the second transceiver system to cause the second transceiver system to transition from a disabled mode in which the second transceiver system is disabled from receiving incoming communication from the wireless network, to a wake-up mode to receive the incoming communication, wherein the first transceiver system is operable in accordance with a first wireless communication protocol and the second transceiver system is operable in accordance with a second wireless communication protocol.

2. A method as defined in claim 1, wherein the second transceiver system consumes more power in the wake-up mode than in the disabled mode.

3. A method as defined in claim 1, further comprising prior to said receiving a notification at the first transceiver system selecting the first transceiver system as a host transceiver system to receive the notification and disabling the second transceiver system so that second transceiver system is disabled from receiving incoming communication from the wireless network.

4. A method as defined in claim 1, wherein transmitting the alert to the second transceiver system from the first transceiver system comprises transmitting one or more of a wake-up call, message, or ping to the second transceiver system from the first transceiver system.

5. A method as defined in claim 3 further comprising selecting the first transceiver system to operate as the host transceiver system based on a determination that the first transceiver system is currently being used or was last used to communicate with one or more nodes of the wireless network.

6. A method as defined in claim 3 further comprising selecting the first transceiver system to operate as the host transceiver system based on one or more of power consumption or coverage area associated with one or more of the plurality of transceiver systems.

7. A method as defined in claim 1, wherein the wireless platform is associated with one or more of a laptop computer, a handheld computer, a tablet computer, desktop computer, a television, a personal data assistant, a wireless telephone, a pager, an audio/video player, a game device, a digital camera, a navigation device, or a wireless peripheral.

8. An article of manufacture including content, which when accessed, causes a machine to:
    receiving a notification at a first transceiver system of a wireless platform having a plurality of transceiver systems, the notification being indicative of an incoming communication from a wireless network and associated with a second transceiver system of the wireless platform; and
    transmitting an alert from the first transceiver system to the second transceiver system to cause the second transceiver system to transition from a disabled mode in which the second transceiver system is disabled from receiving incoming communication from the wireless network, to a wake-up mode to receive the incoming communication,
    wherein the first transceiver system is operable in accordance with a first wireless communication protocol and the second transceiver system is operable in accordance with a second wireless communication protocol.

9. An article of manufacture as defined in claim 8, wherein the content, when accessed, causes the machine to transmit an alert from the first transceiver system to the second transceiver system to cause the second transceiver system to transition from a lower power disabled mode to a higher power wake-up mode to receive the incoming communication.

10. An article of manufacture as defined in claim 8, wherein the content, when accessed, causes the machine to prior to said receiving a notification at the first transceiver system select the first transceiver system as a host transceiver system to receive the notification and disabling the second transceiver system so that the second transceiver system is disabled from receiving incoming communications from the wireless network.

11. An article of manufacture as defined in claim 8, wherein the content, when accessed, causes the machine to transmit the alert to the second transceiver system from the first transceiver system by transmitting one or more of a wake-up call, message, or ping to the second transceiver system from the first transceiver system.

12. An article of manufacture as defined in claim 10, wherein the content, when accessed, causes the machine to select the first transceiver system to operate as the host transceiver system based on a determination that the first transceiver system is currently being used or was last used to communicate with one or more nodes of the wireless network.

13. An article of manufacture as defined in claim 10, wherein the content, when accessed, causes the machine to select the first transceiver system to operate as the host transceiver system based on one or more of power consumption or coverage area associated with one or more of the plurality of transceiver systems.

14. An article of manufacture as defined in claim 8, wherein wireless platform is associated with one or more of a laptop computer, a handheld computer, a tablet computer, a desktop computer, a television, a personal data assistant, a wireless telephone, a pager, an audio/video player, a game device, a digital camera, a navigation device, or a wireless peripheral.

15. An apparatus comprising:
    a receiver to receive a notification at a first transceiver system of a wireless platform having two or more transceiver systems, the notification being indicative of an incoming communication from a wireless network and associated with a second transceiver system of the wireless platform; and
    a transmitter to transmit an alert from the first transceiver system to the second transceiver system to cause the second transceiver system to transition from a disabled mode in which the second transceiver system is disabled from receiving incoming communications from the wireless network, to a wake-up mode to receive the incoming communication,
    wherein the first transceiver system is operable in accordance with a first wireless communication protocol and the second transceiver system is operable in accordance with a second wireless communication protocol.

16. An apparatus as defined in claim 15, wherein said wake-up mode is higher power consumption mode than thee disabled mode.

17. An apparatus as defined in claim 15, further comprising a selector to, prior to said receiver receiving a notification at the first transceiver system, select the first transceiver system as a host transceiver system to receive the notification and disabling the second transceiver system so that the second transceiver system is disabled from receiving incoming communications from the wireless network.

18. An apparatus as defined in claim 15, wherein the alert comprises one or more of a wake-up call, message, or ping.

19. An apparatus as defined in claim 17, wherein said selector to select the first transceiver system to operate as the host transceiver system based on a determination that the first transceiver system is currently being used or was last used to communicate with one or more nodes of the wireless network.

20. An apparatus as defined in claim 17, wherein said selector to select the first transceiver system to operate as the host transceiver system based on one or more power consumption or coverage area associated with one or more of the plurality of transceiver systems.

21. An apparatus as defined in claim 15, wherein the wireless platform is associated with one or more of a laptop computer, a handheld computer, a tablet computer, a desktop computer, a television, a personal data assistant, a wireless telephone, a pager, an audio/video player, a game device, a navigation device, or a wireless peripheral.

22. A system comprising:
   a flash memory; and
   a processor coupled to the flash memory to receive a notification at a first transceiver system of a wireless platform having two or more transceiver systems, the notification being indicative of an incoming communication from a wireless network and associated with a second transceiver system of the wireless platform, and to transmit an alert from the first transceiver system to the second transceiver system to cause the second transceiver system to transition from a disabled mode in which the second transceiver system is disabled from receiving incoming communications from the wireless network, to a wake-up mode to receive the incoming communication,
   wherein the first transceiver system is operable in accordance with a first wireless communication protocol and the second transceiver system is operable in accordance with a second wireless communication protocol.

23. A system as defined in claim 22, wherein said wake-up mode is higher power consumption mode than the disabled mode.

24. A system as defined in claim 22, wherein said processor to, prior to said receive receiving a notification at first transceiver system, select the first transceiver system as a host transceiver system to receive the notification and disabling the second transceiver system so that the second transceiver system is disabled from receiving incoming communications from the wireless network.

25. A system as defined in claim 22, wherein the alert comprises one or more of a wake-up call, message, or ping.

26. A system as defined in claim 24, wherein the processor is configured to select the first transceiver system to operate as the host transceiver system based on a determination that the first transceiver system is currently being used or was last used to communicate with one or more nodes of the wireless network.

27. A system as defined in claim 24, wherein the processor is configured to select one of the plurality of transceiver systems to operate as the host transceiver system based on one or more of power consumption or coverage area associated with one or more of the plurality of transceiver systems.

* * * * *

UNITED STATES PATENT AND TRADEMARK OFFICE
CERTIFICATE OF CORRECTION

PATENT NO. : 7,392,061 B2 Page 1 of 1
APPLICATION NO. : 11/014580
DATED : June 24, 2008
INVENTOR(S) : Roger A. Hurwitz et al.

It is certified that error appears in the above-identified patent and that said Letters Patent is hereby corrected as shown below:

Column 8
Line 61, "...incoming communication..." should read --...incoming communications...--.

Column 9
Line 8, "...so that second..." should read --...so that the second...--.
Line 9, "...incoming communication..." should read --...incoming communications...--.
Line 45, "...incoming communication..." should read --...incoming communications...--.

Column 10
Lines 43-44, "...is higher...thee disabled mode." should read --...is a higher...the disabled mode.--.

Column 12
Line 5, "...receive receiving...at first..." should read --...receiver receiving...at the first...--.

Signed and Sealed this

Twenty-first Day of October, 2008

JON W. DUDAS
*Director of the United States Patent and Trademark Office*